United States Patent
Grabowski et al.

[19]

[11] Patent Number: 6,098,855
[45] Date of Patent: Aug. 8, 2000

[54] LICENSE PLATE CARRIER FOR A MOTOR VEHICLE

[75] Inventors: Norbert E. Grabowski, Rochester Hills; Joseph M. Geraci, Lake Orion; Timothy W. Anness, Rochester Hills; Carl Mather, Lake Orion, all of Mich.

[73] Assignee: Chrysler Corporation, Auburn Hills, Mich.

[21] Appl. No.: 09/131,622

[22] Filed: Aug. 10, 1998

[51] Int. Cl.[7] .................................................. B62D 43/02
[52] U.S. Cl. ........................... 224/42.2; 40/200; 40/204; 224/42.21; 296/37.2
[58] Field of Search ............................... 224/42.13, 42.2, 224/42.21, 42.24; 40/200, 209, 204, 205, 206; 296/37.2, 37.3

[56] References Cited

U.S. PATENT DOCUMENTS

| | | | |
|---|---|---|---|
| D. 389,438 | 1/1998 | Guichard et al. ......................... D12/98 |
| 1,244,417 | 10/1917 | Brosman ................................. 224/42.2 |
| 1,321,017 | 11/1919 | Draver ..................................... 224/42.2 |
| 1,390,291 | 9/1921 | Hill ........................................... 40/204 |
| 1,593,921 | 7/1926 | Sutherland ............................. 224/42.2 |
| 4,917,426 | 4/1990 | Copp ....................................... 293/142 |
| 5,921,449 | 7/1999 | Saegusa et al. ........................ 224/42.2 |

*Primary Examiner*—Stephen P. Garbe
*Attorney, Agent, or Firm*—Mark P. Calcaterra

[57] ABSTRACT

A system for mounting a spare tire and a license plate to a motor vehicle includes a tire mounting member having a bracket fixedly attached to a rear surface of the motor vehicle. The system further includes a license plate carrier pivotally connected to the bracket for rotation about a pivot axis. The license plate carrier includes a display portion oriented in a substantially vertical plane and spaced from the rear surface of the motor vehicle. A plurality of threaded shafts rearwardly extend from the tire mounting member for mounting the spare tire thereto. The license plate carrier includes a boss portion for receiving one of the threaded shafts to thereby selectively prevents rotation of the license plate carrier about the pivot axis.

17 Claims, 3 Drawing Sheets

LICENSE PLATE CARRIER FOR A MOTOR VEHICLE

BACKGROUND OF THE INVENTION

1. Technical Field

The present invention generally pertains to motor vehicles. More particular, the present invention pertains to a spare tire and license plate mounting system for a motor vehicle. More specifically, but without restriction to the particular embodiment and/or use which is shown and described for purposes of illustration, the present invention relates to a spare tire and license plate mounting system for a motor vehicle which incorporates a swing-away license plate carrier that obviates license plate mounting concerns for vehicles having a rear mounted spare tire.

2. Discussion

It is well known in the motor vehicle field to mount a spare tire to a rear panel. This spare tire mounting technique is commonly employed for sport utility vehicles and the like which do not have a conventional trunk for storage. By mounting the spare tire to the exterior surface of a rear liftgate, the interior of the vehicle is not encumbered by the tire. Additionally, access problems associated with mounting the spare tire to an underside of the frame are avoided.

Mounting of a spare tire to the liftgate presents two concerns. First, the area for mounting of a license plate is effectively reduced. This concern becomes particularly problematic in view of today's global marketplace. In this regard, it is desirable that a motor vehicle accommodate all export license plate sizes and satisfy homologation requirements. Secondly, a rear mounted spare tire may detract from vehicle styling. Thus, in addition to providing a suitable area for license plate mounting, it is also desirable to at least partially conceal the spare tire and thereby present an improved aesthetic appearance while retaining easy access to the spare tire.

SUMMARY OF THE INVENTION

It is a general object of the present invention to provide a spare tire and license plate mounting system which overcomes the disadvantages associated with the prior art, including but not limited to those discussed above.

It is a more particular object of the present invention to provide an apparatus for use on a motor vehicle having a spare tire mounted to a rear surface thereof which accommodates various license plate sizes and satisfies homologation requirements relating to the display of the license plates while also covering the tire and retaining easy access to the tire.

In one form, the present invention provides an apparatus for mounting a license plate to a motor vehicle having a spare tire mounted to a rear panel through a plurality of threaded shafts. The apparatus includes a mounting portion adapted to be pivotally interconnected to the motor vehicle for rotation about a pivot axis to selectively provide access to the spare tire. The apparatus further includes a display portion carried by the mounting portion. The display portion is adapted to be oriented in a substantially vertical plane and spaced apart from a rear surface of the motor vehicle such that the spare tire is mounted to the motor vehicle interbetween the rear surface and the display portion.

In another form, the present invention provides a system for mounting a spare tire and a license plate to a motor vehicle. The system includes a tire mounting member having a bracket adapted to be fixedly attached to a rear surface of the motor vehicle. A plurality of threaded shafts rearwardly extends from the bracket for engaging the spare tire. The system further includes a license plate carrier pivotally connected to the bracket for rotation about a pivot axis. The license plate carrier includes a display portion adapted to be oriented in a substantially vertical plane and spaced from the rear surface of the motor vehicle. In the preferred embodiment, the license plate carrier includes a rearwardly extending boss portion for receiving one of the threaded shafts and preventing rotation of the license plate carrier about the pivot axis.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
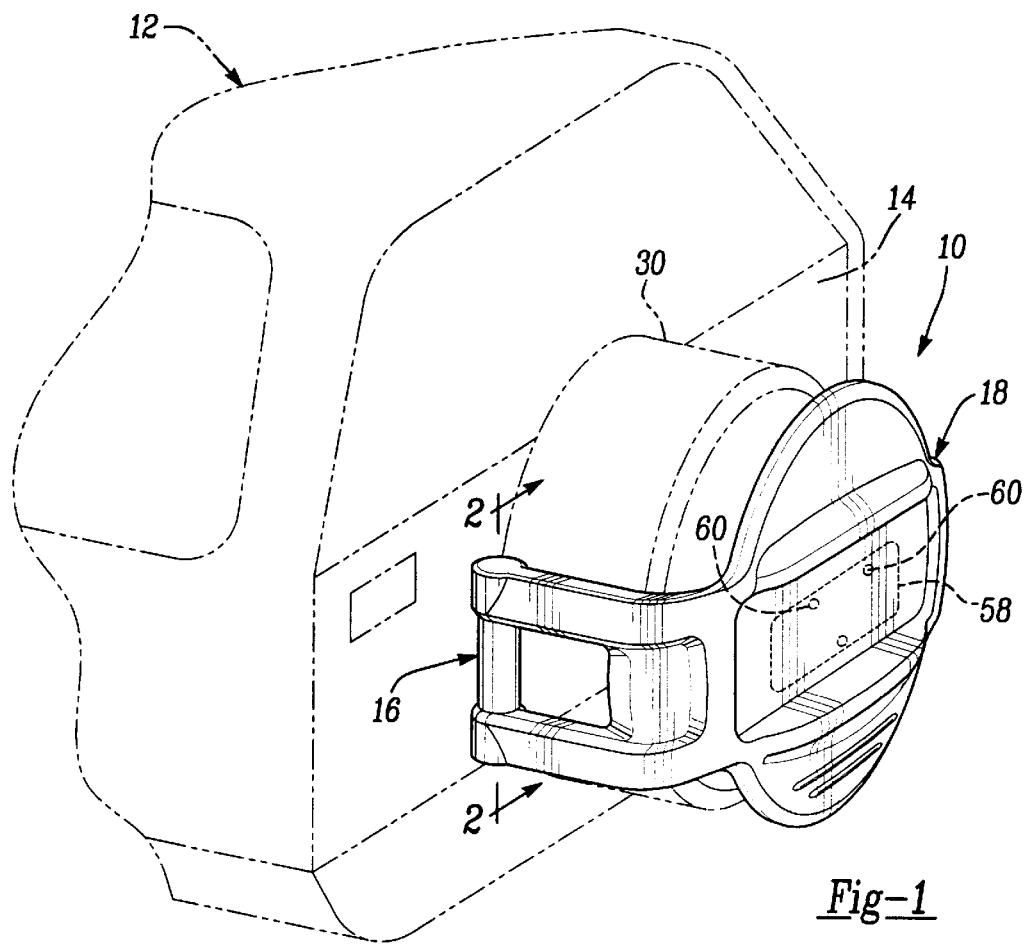
FIG. 1 is a perspective view illustrating a spare tire and license plate mounting system constructed in accordance with the teachings of a preferred embodiment of the present invention operatively installed on a motor vehicle.
Figure 2:
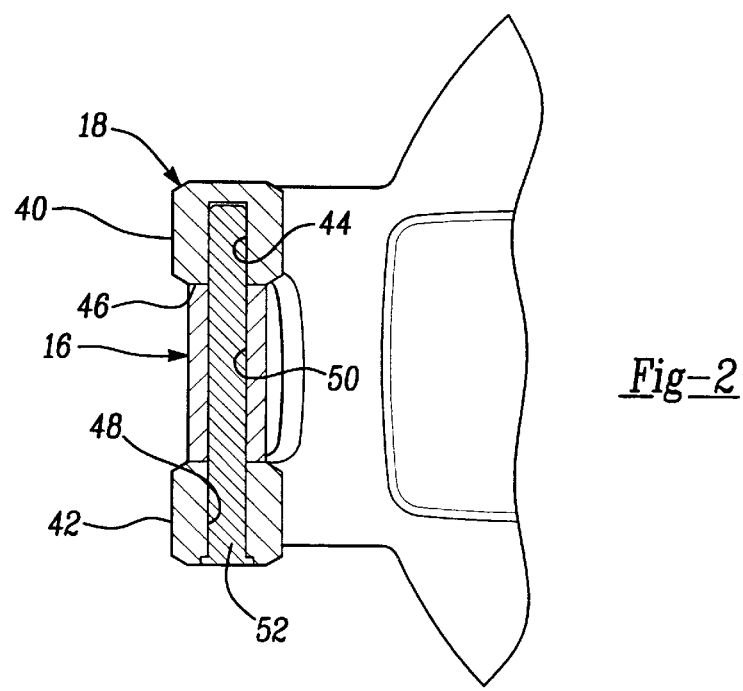
FIG. 2 is a cross-sectional view taken along the line 2—2 of FIG. 1.
Figure 3:
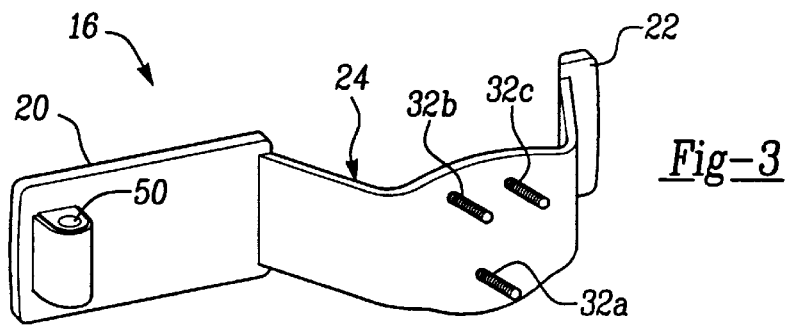
FIG. 3 is an enlarged perspective view of a spare tire mounting member of FIG. 1.
Figure 4:
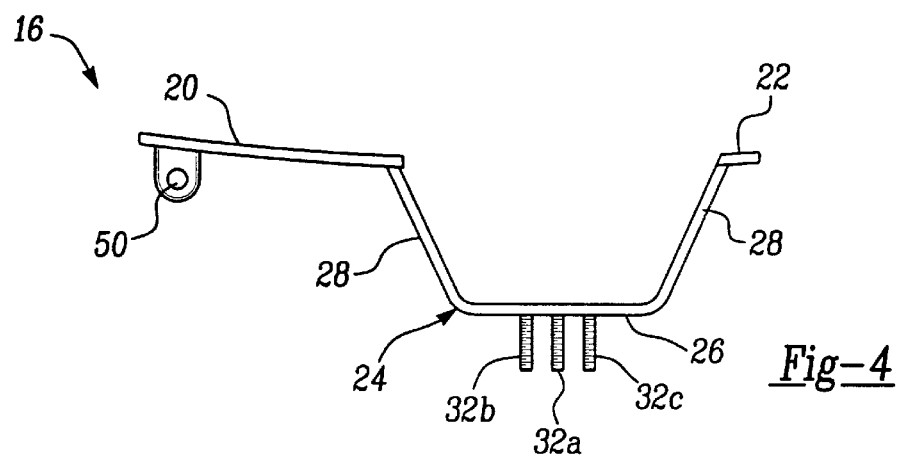
FIG. 4 is a top view of the spare tire mounting member of FIG. 1.
Figure 5:
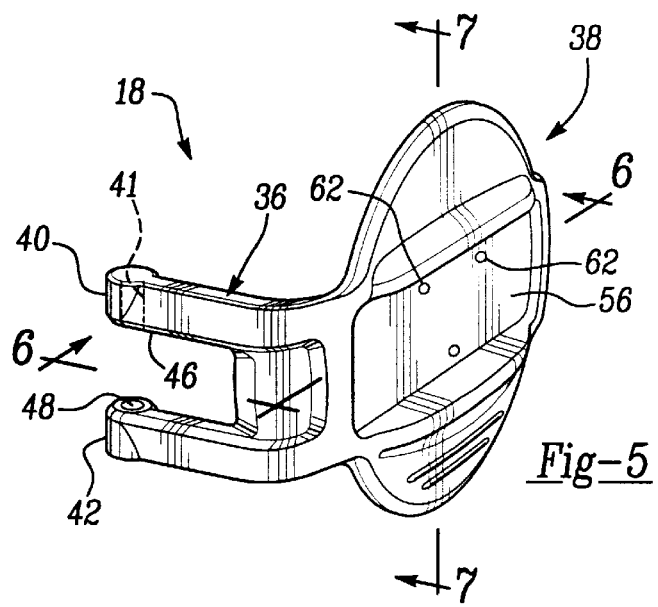
FIG. 5 is an enlarged perspective view of a license plate carrier of FIG. 1.
Figure 6:
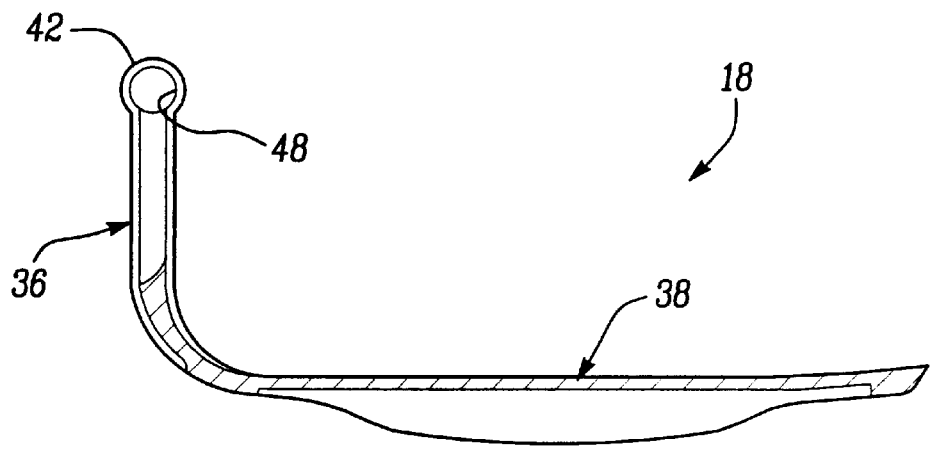
FIG. 6 is a cross-sectional view taken along the line 6—6 of FIG. 5.

With initial reference to the environmental view of FIG. 1, a system for mounting a spare tire and a license plate to a motor vehicle constructed in accordance with the teachings of a preferred embodiment of the present invention is generally identified with reference numeral 10. The system 10 of the present invention is shown operatively associated with a motor vehicle 12 having a rear liftgate 14. It will be understood by those skilled in the art that the particular vehicle 12 shown is merely exemplary and that the teachings of the present invention have applicability to a wide range of vehicles.

With continued reference to FIG. 1, and additional reference to FIGS. 2–7, the system of the present invention is shown to generally include a tire mounting member 16 and a license plate carrier 18. As particularly shown in FIGS. 3 and 4, the tire mounting member 16 includes first and second body attachment portions 20 and 22. The attachment portions 20 and 22 are generally planar and are fixedly attached to the lift gate 14 of the motor vehicle 12. In the preferred embodiment, the attachment portions 20 and 22 are welded or otherwise suitably attached to the liftgate 14.

The tire mounting member 16 additionally includes a central portion 24 bridging the first and second attachment portion 20 and 22. The central portion 24 includes a face 26 and a pair of segments 28 connecting the face 26 with the first and second attachment portions 20 and 22. The face 26 is adapted to abut an inner surface of a wheel of a spare tire 30.

A plurality of threaded shafts 32a, 32b, and 32c rearwardly extend from the face 26. In the preferred embodiment, the plurality of threaded shafts 32a –c are three in number and are adapted to conventionally engage mounting apertures (not shown) provided in the wheel of the tire 30.

The license plate carrier 18 is shown to generally include a mounting portion 36 oriented generally parallel to a longitudinal axis of the vehicle 12 and a display portion 38 oriented generally perpendicular to the mounting portion 36. In the preferred embodiment, the mounting portion 36 is illustrated to include first and second vertically spaced apart arms 40 and 42. To provide means for pivotally interconnecting the license plate carrier 18 with the motor vehicle 12, the first arm or upper arm 40 of the mounting portion 36 defines an aperture 41 vertically extending a portion therethrough from a bottom surface 46. The second arm or lower arm 42, defines an aligning aperture 48 passing therethrough. These apertures 41 and 48 cooperate with an aperture 50 defined by the tire mounting member 16 to receive a pivot pin 52. In this regard, the pivot pin 52 is press fit into the apertures 44, and 48 of the first and second mounting arms 40 and 42, respectively, and rotatably passes through the aperture 50 of the tire mounting member 16. While not illustrated, it will be understood that suitable bearings may be employed to facilitate relative rotation between the tire mounting member 16 and the license plate carrier 18. The pivot pin 52 defines a vertical pivot axis.

In the exemplary embodiment illustrated, the display portion 38 of the license plate carrier 18 has a generally circular overall shape with a diameter substantially equal to that of the spare tire 30. As a result, the display portion 38 conceals the spare tire 30 in rear view and provides an aesthetically improved appearance. The display portion 38 includes a central mounting area 56 to which a license plate 58 (in fathom lines in FIG. 1) is secured. The license plate 58 is secured in a conventional manner with threaded fasteners 60 which engage internally threaded apertures 62. To provide means for preventing rotation of the license plate carrier 18 about the pivot access defined by the pivot pin 52, the license plate carrier 18 includes a rearwardly extending boss portion 64. The boss portion 64 is adapted to receive one of the threaded shafts 32 a extending from the tire mounting member 18. The embodiment illustrates the threaded shaft 32a is longer than the remaining threaded shafts 32b and c. A lug nut 66 engages the threaded shaft 32a.

Figure 7:
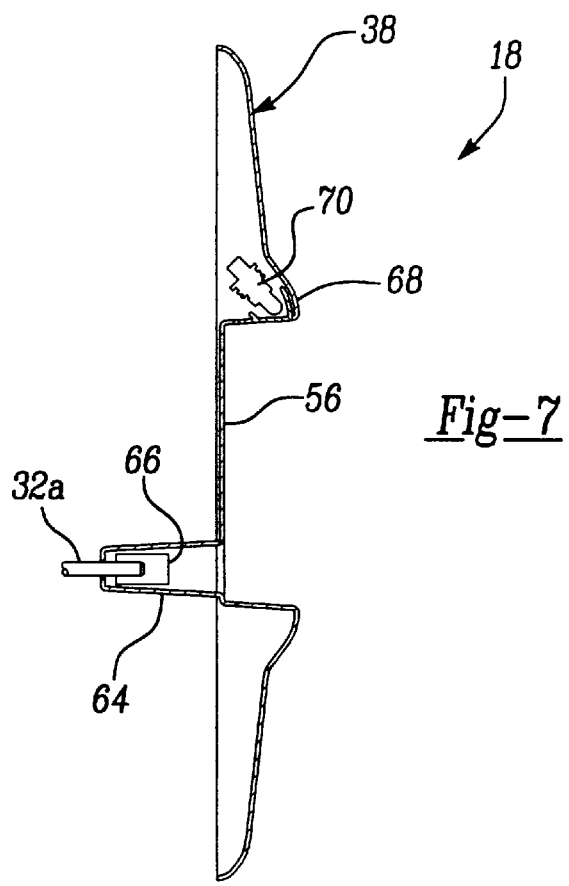
FIG. 7 is a cross-sectional view taken along the line 7—7 of FIG. 5.

As shown most particularly in FIG. 7, the display portion 38 includes a rearwardly extending flange 68 disposed superadjacent the central mounting area 56. A lamp 70 is carried within the rearwardly extending flange 68 for illuminating the license plate 58. While not illustrated, it will be understood by those skilled that the lamp 70 is conventionally wired to the motor vehicle electrical system.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An apparatus for mounting a license plate to a motor vehicle having a spare tire mounted to a rear panel through a plurality of threaded shafts, the apparatus comprising:
   a mounting portion adapted to be pivotally interconnected to the motor vehicle for rotation about a pivot axis to selectively provide access to the spare tire; and
   a display portion carried by said mounting portion, said display portion adapted to be oriented in a substantially vertical plane and spaced apart from a rear surface of the motor vehicle such that the spare tire is mounted to the motor vehicle interbetween the rear surface and said display portion, said display portion including means for preventing rotation about said pivot axis, said means for preventing rotation comprising means for receiving at least one of the plurality of threaded shafts.

2. The apparatus for mounting a license plate to a motor vehicle of claim 1, wherein said mounting portion includes first and second vertically spaced about arms, each arm having a distal end for pivotal interconnection to the motor vehicle.

3. The apparatus for mounting a license plate to a motor vehicle of claim 1, wherein said display portion is generally circular and has a diameter substantially equal to the spare tire.

4. The apparatus for mounting a license plate to a motor vehicle of claim 1, wherein said means for receiving at least one of the plurality of threaded shafts comprises a rearwardly extending boss portion and a lug nut.

5. The apparatus for mounting a license plate to a motor vehicle of claim 1, wherein said display portion includes a central mounting area for receiving the license plate and said display portion includes a rearwardly extending flange disposed superadjacent said central mounting area, and further wherein said apparatus includes a light source carried within said rearwardly extending flange for illuminating the license plate.

6. A system for mounting a spare tire and a license plate to a motor vehicle, the system comprising:
   a tire mounting member including a bracket adapted to be fixedly attached to a rear surface of the motor vehicle;
   a plurality of threaded shafts rearwardly extending from said bracket;
   a license plate carrier pivotally connected to said bracket for rotation about a pivot axis, said license plate carrier including a display portion adapted to be oriented in a substantially vertical plane and spaced from the rear surface of the motor vehicle; and
   a boss portion rearwardly extending from said display portion, said boss portion receiving one of said plurality of threaded shafts for securing said display portion to said bracket so as to prevent rotation of said license plate carrier about said pivot axis.

7. The system for mounting a spare tire and a license plate to a motor vehicle of claim 6, wherein said license plate carrier includes a mounting portion having first and second vertically spaced about arms.

8. The system for mounting a spare tire and a license plate to a motor vehicle of claim 7, further comprising a pivot pin passing through a vertical aperture provided in said tire mounting member and further passing through said first and second vertically spaced apart arms, said pivot pin defining said pivot axis.

9. The system for mounting a spare tire and a license plate to a motor vehicle of claim 6, wherein said display portion includes a central mounting area for receiving the license plate and said display portion includes a rearwardly extending flange disposed superadjacent said central mounting area, and further wherein said apparatus includes a light source carried within said rearwardly extending flange for illuminating the license plate.

10. A motor vehicle comprising:

a rear liftgate;

a tire mounting member including a bracket, said bracket fixedly attached to said liftgate;

a plurality of threaded shafts rearwardly extending from said tire mounting member;

a spare tire mounted to said tire mounting member by said threaded shafts;

a license plate carrier removably secured to one of said threaded shafts, said license plate carrier including a display portion oriented in a vertical plane and horizontally spaced from said liftgate, said license plate carrier including a boss portion for receiving the at least one of the plurality of threaded shafts; and a license plate attached to said display portion.

11. The motor vehicle of claim 10, wherein said license plate carrier is pivotally attached to said tire mounting member.

12. The motor vehicle of claim 11, wherein said license plate carrier includes a mounting portion having first and second vertically spaced about arms.

13. The motor vehicle of claim 12, further comprising a pivot pin passing through a vertical aperture provided in said tire mounting member and further passing through said first and second vertically spaced apart arms, said pivot pin defining said pivot axis.

14. The motor vehicle of claim 10, wherein said display portion includes a central mounting area for receiving the license plate and said display portion includes a rearwardly extending flange disposed superadjacent said central mounting area, and further wherein said apparatus includes a light source carried within said rearwardly extending flange for illuminating the license plate.

15. An apparatus for mounting a license plate to a motor vehicle having a spare tire mounted to a rear panel, the apparatus comprising:

a first member adapted to be fixedly mounted to the rear panel for supporting the spare tire, said first member including a shaft; and a second member including a mounting portion and a rigid display portion;

said mounting portion pivotally attached to said first member for rotation about a pivot axis, said display portion being generally circular and having diameter substantially equal to the spare tire;

said display portion adapted to be oriented in a substantially vertical plane and spaced apart from a rear surface of the motor vehicle such that the spare tire is mounted to the motor vehicle interbetween the rear panel and said display portions;

a boss portion rearwardly extending from said displaying portion, said boss portion receiving said shaft so as to prevent rotation of said display portion about said pivot axis.

16. The apparatus for mounting a license plate to a motor vehicle of claim 15, wherein said mounting portion includes first and second vertically spaced about arms, each arm having an end for pivotal interconnection to the motor vehicle.

17. The apparatus for mounting a license plate to a motor vehicle of claim 15, wherein said display portion includes a central mounting area for receiving the license plate and said display portion includes a rearwardly extending flange disposed superadjacent said central mounting area, and further wherein said apparatus includes a light source carried within said rearwardly extending flange for illuminating the license plate.

* * * * *